UNITED STATES PATENT OFFICE 2,060,160

ART OF SAUSAGE MANUFACTURE

Hugh E. Allen, Evanston, Ill., assignor of one-half to Albert G. McCaleb, Evanston, Ill.

No Drawing. Application May 31, 1935,
Serial No. 24,364

4 Claims. (Cl. 99—175)

My invention contemplates and provides a method and material whereby and wherewith to produce processed sausages, e. g., frankfurters and bologna, of maximum excellence.

"Processed sausages", as the term is used in this specification, means frankfurters, thueringers, bologna, etc., which are smoked and/or cooked in the course of their preparation for the market.

A salient object of the present invention is the preparation of processed sausages which, as marketed, are possessed of uniform and desirable plumpness and firmness, and are substantially immune from casing wrinkles, internal voids and free moisture.

Another important object of the invention is the production of processed sausages which, as marketed, retain (a) all or substantially all of the nutritive, flavoring and aromatic qualities of the comminuted meat and other food products originally placed in their casings, and (b) a remarkably large and desirable percentage of water absorbed by the casing contents during the "cold chopping" thereof.

Another object of the invention is the production of processed sausages (requiring and preferably containing no possibly harmful preservatives) which, as marketed, are practically immune from the effects of aerobic bacteria and are unusually resistant to spoilage resultant from the activities of aerobic bacteria.

A remarkable feature of the invention is the fact that its objectives are attained by the introduction into the sausage casing contents, preferably during the "cold chopping" thereof, of a properly vehicled percentage of agar-agar (sometimes called Bengal isinglass). Agar-agar is a dried seaweed, or vegetable gum, usually obtained from the vicinity of Singapore. In fact, the present invention properly may be said to be predicated upon my discovery that agar-agar possesses certain properties, of great and hitherto unrecognized value in sausage manufacture which, under appropriate conditions, are manifested at the different successive temperatures to which processed sausages are subjected in the course of their preparation for the market.

While, as will hereinafter appear, I am enabled to realize certain advantages of the present invention by utilizing, instead of agar-agar, certain other vegetable gums, or mixtures of same with each other or with agar-agar, I prefer to employ pure pulverulent agar-agar in order to accomplish the purposes of the invention.

In producing sausages in the conventional way, meat chunks and trimmings, either raw or cured, together with cereal filler, if any, added curing salt or common salt, if any, and flavoring ingredients (usually consisting of or comprising spices, peppers, spice essences, spice oils and/or oleoresins of peppers) are placed in a motor driven chopper. To the foregoing ingredients is added broken ice of a weight equal to from 25% to 100% of the weight of the meat chunks and trimmings. The chopper is then operated to reduce the meat to particles of the requisite size, and to effect a complete intermixture of the chopper contents. As the ice melts, it lowers the temperature of the chopped mixture to minimize and prevent augmentation of its bacteria count. The resultant ice water, being very largely absorbed by the comminuted meat and accompanying cereals, washes the added salt and the flavoring ingredients into the said meat and cereals.

The chopped solid materials, and their entrained moisture, are then stuffed into suitable casings, i. e., either natural gut casings or artificial casings. Such casings are and must be more or less porous in order that their contents properly may be affected by the smoking operation which is next performed.

In the smoke house the sausages usually attain temperatures varying from 140° F. to 145° F. They usually remain in the smoke house from one to eight hours, depending upon the diameter of the sausages, their variety and the degree of smoking desired. In the smoke house, and while the smoke is being absorbed through the pores of the casings, occur other natural phenomena which tend objectionably to affect the ultimate appearance, structure, and quality of the sausages. The casing contents increase in volume. Certain of the casing contents release their moisture. Some of the moisture turns to vapor. The pressure within the casings increases. Due to increased internal pressure or to applied heat, or due to both of these causes, the pores of the casing expand, with a resultant sweating or leakage of liquid and vapor from the casings.

Certain processed sausages, e. g., frankfurters and bologna, are now cooked at temperatures varying from 155° F. to 175° F. During the cooking the pores of the casings remain expanded, or are further expanded, and the solids of the casing contents continue to release moisture. Some of this moisture vaporizes and escapes through the casing pores,—the major portion of the moisture which does not thus escape appearing as free moisture in the sausages as marketed.

As the result of the natural phenomena just discussed, processed sausages, produced in accordance with the usual method, are subject to certain serious objections. Their casings are usually wrinkled,—because of the shrinkage of their contents in smoking and cooking. They are not of uniform flavor because of the uncontrolled escape of volatile flavoring ingredients from the casings during smoking and cooking. The free moisture which the casings contain encourages the development and distribution of bacteria in and throughout the sausages. There are distinct voids in the casing contents. The sausages usually are not plump and firm.

In introducing agar-agar into sausage manufacture, I prefer initially to mix it with the cereal which goes into the sausages. Thus, for example, when the cereal employed is soya flour, I chop and mill the agar-agar to the fineness of the soya flour and then thoroughly mix from five to ten pounds of the finely divided agar-agar with each ninety to ninety-five pounds of finely divided soya flour. In other words, the agar-agar preferably constitutes from 5% to 10% of the mixture of cereal vehicle and agar-agar.

It is not imperative that soya flour be the cereal which constitutes the vehicle for the agar-agar. Finely divided wheat flour, buckwheat flour and corn flour, used separately, or mixed with one or more of the others, or with soya flour, constitute satisfactory cereal vehicles for the agar-agar.

I prefer that approximately five to ten pounds of the mixture of cereal and agar-agar shall be intermixed with each ninety to ninety-five pounds of meat chunks and trimmings which go into the sausage chopper. In other words, I prefer that the agar-agar shall constitute from one quarter of one per cent (¼ of 1%) to one per cent (1%) of the total weight of the meat, cereal and agar-agar which goes into the sausages.

In making sausages which have no cereal content, the agar-agar preferably constitutes from one quarter of one percent (¼ of 1%) to one per cent (1%) of the combined weight of the meat and agar-agar. When the agar-agar is directly applied to the meat in the chopper, as distinguished from being applied in a cereal vehicle, it is highly desirable that the agar-agar be distributed over the meat chunks and trimmings with the greatest possible uniformity in order that it may be very evenly distributed throughout the sausage casing filler as it goes into the casings.

With the agar-agar, either with or without its cereal vehicle, added to the meat chunks and trimmings, the appropriate flavoring ingredients, and salts, if any, and ice, are added to the contents of the chopper and the manufacture of the sausages proceeds in the usual way.

As the "cold chopping" is performed, the agar-agar begins very slowly to take unto itself the aqueous liquids resulting from the melting of the ice and the draining of the meat undergoing the chopping operation. However, and notwithstanding that the agar-agar has the power to absorb a truly prodigious amount of water and aqueous meat juices, this power is exerted very slowly, indeed almost imperceptibly, at the low temperature which exists in the chopper. The slowness with which agar-agar absorbs water and aqueous juices at the low temperature of the chopper is of decided advantage, because it is essential that the chopped materials, as they come from the chopper, be of such consistency that they readily may be introduced into the sausage casings with the aid of conventional casing stuffing machines.

When the sausages are placed in the smoke house, and the temperature of the sausages is brought to and maintained at from 140° F. to 145° F., the absorption by the agar-agar of water and aqueous meat juices is greatly accelerated. The agar-agar in its now greatly expanded and jelly-like condition, acts substantially to seal the casing pores against the egress from the casings of aqueous vapors including vapors from the flavoring ingredients of the casing contents. Thus the escape of moisture from the sausage casings, in the smoke house, is reduced to a minimum. However, and notwithstanding that the expanded and jelly-like agar-agar substantially seals the casing pores against the egress of aqueous vapors from the casings, the presence of agar-agar at and in the pores does not prevent the proper smoking of the casing contents,—presumably because the smoke is absorbed and passed inwardly by the minute portions of agar-agar which substantially plug the casing pores against egress of moisture.

During the conventional cooking step, usually performed at temperatures from 155° F. to 175° F., the pores of the casings remain substantially sealed against the egress of aqueous vapors and liquid from the casings. However, at the relatively high temperatures to which the sausages are subjected in the cooking operation, the agar-agar now very rapidly takes unto itself all or substantially all of the free moisture remaining in the casings.

At the conclusion of the cooking operation, the sausages are usually "shocked" by the sudden application of cold water and are then placed in a cooler until marketed. When the sausages are cooled, the agar-agar and its entrained moisture become a jelly which fills the voids which otherwise would exist in the casing contents. Having once jelled, the agar-agar does not yield up its absorbed moisture under any of the temperatures which sausages ordinarily encounter intermediate manufacture and their ultimate sale.

Since discovering the beneficient effects of agar-agar when introduced into processed sausages, I have conducted experiments to determine whether or not there are other vegetable gums which I may substitute for the agar-agar. While I have been unable to find any other gum which, for my purposes, is as satisfactory as agar-agar, I have ascertained that desirable results can be realized by substituting gum tragacanth, gum arabic, gum karaya or locust gum, or mixtures of these gums, for the agar-agar. When gum tragacanth is employed it usually should constitute from one-half of one per cent (½ of 1%) to two per cent (2%) of the total weight of the meat and cereal (if present) and gum, going into the sausage casing filler. When any of gums arabic, karaya or locust are employed, they usually should constitute from three fourths of one per cent (¾ of 1%) to three per cent (3%) of the total weight of the meat, and cereal (if present) and gum, going into the sausage casting filler.

Having thus described my invention, what I claim as new and desire to secure by United States Letters Patent is:

1. The improvement in the art of making processed sausage which consists in introducing into the filler of a sausage casing a minor quantity of agar-agar sufficient substantially to obstruct the egress of moisture from the casing during hot processing and to jell the free moisture residual in the casing when the sausage is cooled.

2. The improvement in the art of making processed sausage which consists in introducing into the filler of a sausage casing a minor quantity of edible water-absorbent vegetable gum sufficient substantially to obstruct the egress of moisture from the casing during hot processing and to jell the free moisture residual in the casing when the sausage is cooled.

3. As an article of manufacture, a processed sausage, substantially devoid of casing wrinkles, which includes in its casing filler a quantity of agar-agar sufficient substantially to prevent the egress of moisture through the casing pores when the sausage is hot and to jell the free moisture of the casing contents when the sausage is cold.

4. As an article of manufacture, a processed sausage, substantially devoid of casing wrinkles, which includes in its casing filler sufficient edible water-absorbent vegetable gum substantially to prevent the egress of moisture through the casing pores when the sausage is hot and to jell the free moisture of the casing contents when the sausage is cold.

HUGH E. ALLEN.